Sept. 3, 1963 O. LINDSTRÖM 3,102,791
SERIES CONNECTED MULTIPLE EXTRACTION APPARATUS
WITH OPEN TRANSFER LINES
Filed Sept. 1, 1959 2 Sheets-Sheet 1

INVENTOR.
Olle Lindström.
BY
Attorney.

United States Patent Office 3,102,791
Patented Sept. 3, 1963

3,102,791
SERIES CONNECTED MULTIPLE EXTRACTION
APPARATUS WITH OPEN TRANSFER LINES
Olle Lindström, Västeras, Sweden, assignor to Allmanna
Svenska Elektriska Aktiebolaget, Västeras, Sweden, a
Swedish corporation
Filed Sept. 1, 1959, Ser. No. 837,556
Claims priority, application Sweden Sept. 8, 1958
1 Claim. (Cl. 23—270.5)

Liquid-liquid extraction has recently become of great industrial importance. These operations are used in the petroleum industry and in the nuclear energy industry inter alia for uranium refining and for the processing of spent nuclear fuel for the recovery of plutonium, uranium or thorium. The extraction process has proved very successful in the reprocessing of nuclear fuel, particularly because of the highly efficient separation of the fuel from the fission products.

The costs for a reprocessing plant using liquid-liquid extraction are, however, very high despite the rather simple principle of the process. The reason for this is the special techniques which have to be employed due to the risks associated with the radio active radiation emerging from the fission products present in the nuclear fuel. Considerable plant costs are caused by the fact that the chemical equipment has to be contained in sealed cells surrounded by thick concrete walls for protection. Furthermore, equipment and means are required for remote control and remote supervision, and for the exchange and repair of damaged parts of the apparatus.

It has been found that the total costs of construction for such a reprocessing plant are approximately proportional to the "shielded volume," i.e. the volume of the buildings which contain the active parts for the process. The direct way for reducing the costs for the plant and thus the total processing costs, since the latter are almost completely governed by the former, is therefore to minimize the shielded volume.

Figure 1:
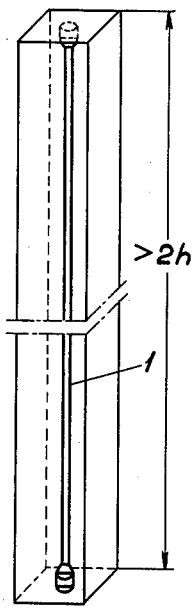
Figure 2:
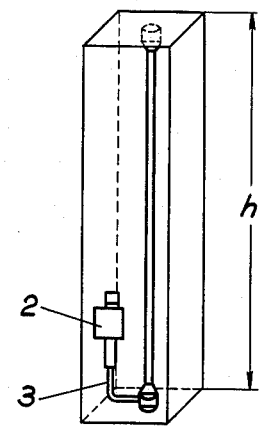
Figure 3:
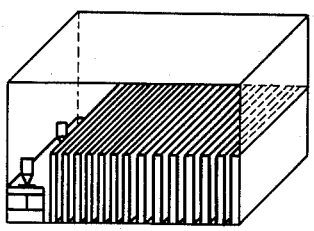
Figure 4:
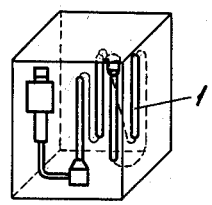
Figure 5:
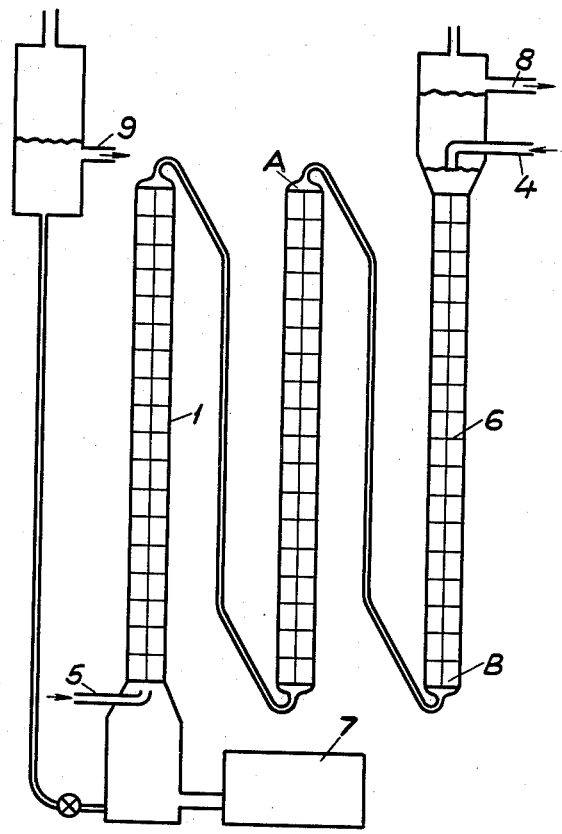

In the drawing the FIGURES 1 to 3 show diagrammatically known arrangements of the apparatus, whereas FIGURE 4 shows the present invention. The scale is approximately the same for all the figures. The height of the column in FIGURE 1 is more than twice the height of that in FIGURE 2. FIGURE 5 illustrates the basic principle of the invention.

The development in this field is characterized by the endeavour to lower the costs of the plant by means of more compact design of the equipment. The column according to FIGURE 1 must be made very high, usually up to 25 m., because of its relatively poor extraction efficiency. These columns are used sometimes in the so-called Redox process for the extraction of plutonium by means of methylisobutylketone. The packed columns are often accommodated, for economic reasons, in a separate building. Nevertheless, the costs of the plant become high and it will be noted that equipment costs account for less than 10 percent only of the total costs.

The introduction of the so-called pulsed columns according to FIGURE 2 has resulted in a considerable reduction of the height of the column. The pulsed column is characterised in that the contents of the column are subjected to a pulsing movement which is superimposed on the net transport of the two liquid phases moving in counter-current flow. The pulsing movement is usually brought about by a diaphragm or piston pump 2 connected through a line 3. Pulsing is sometimes also used in packed columns. In general, however, pulsed columns are provided with perforated or slit bottoms through which the liquid is forced back and forth by the pulsing. The efficient stirring and the continuous formation of new liquid drops at the passage through the openings in the bottoms has the result that the distribution equilibria are reached quickly so that shorter columns can be used. The space required in the vertical direction has been reduced further in extraction apparatus of the so-called mixer-settler type which is shown diagrammatically in FIGURE 3. A mixer-settler unit consists of a mixing chamber (mixer) and a separating chamber (settler). In the mixing chamber the two liquid phases are mixed thoroughly by means, for instance, of motor driven stirring devices, and the mixture is thereafter separated in the separating chamber. The mixer-settler units are series-connected and placed, in general, in the same plane, so that the space required in the horizontal direction is large. The comparatively complicated mechanical means for the mixer-settlers constitute a serious drawback, especially in the extraction of radio-active solutions since they have to be tight and because of the fact that repair and maintenance work has to be effected by remote technique.

The high costs which characterise the application of extraction method within the domain of nuclear energy for the reasons mentioned above have thus given rise to very extensive development work on quite novel methods for the processing of nuclear fuels. The present invention teaches, however, that it is possible, in a surprisingly simple manner, to reduce the high costs of construction for extraction equipments and that the conventional extraction process can well stand its ground even in comparison with newer methods for the production of fuels. Apart from these weighty economical reasons which are of greatest importance in the nuclear energy domain, considerable technical advantages are also gained so that the invention is also applicable for other uses.

The feature of the invention resides in that a pulsed column constructed in a manner known per se is divided into a number of smaller column elements positioned side by side and series-connected one to another by connection lines and that the volume contained in each connection line is less than or of the same order of magnitude as the pulsed volume. The pulsed volume is the volume which is displaced in one pulse.

The mechanical power which is supplied at a pulsing for bringing about an effective contact between the two liquid phases will thus also bring about a transport of the two liquid phases in both directions respectively between the column elements.

FIGURE 4 shows for the purpose of comparison an arrangement according to the invention, wherein the single column in FIGURE 2 is divided into four column elements, one pair of them behind the other pair. It is evident that the "shielded volume" is considerably reduced in comparison with the arrangement of FIGURE 2. It may be suitable to proceed with the division further than indicated in FIGURE 4, with many more column elements, with the result that the space required is once more reduced.

FIGURE 5 illustrates the principle of the construction according to the invention wherein only three series-connected column elements are shown by way of example. Obviously the elements may be placed in several rows close side by side and/or be displaced with respect to each other in the vertical direction.

During the extraction process for instance, one component of the heavy solution which is supplied at 4 is extracted by the lighter organic solvent supplied at 5. The pulsed column is provided with thin perforated bottoms 6. At every stroke of the pulsing means 7, the two phases are forced to and fro through the openings in the bottoms thus bringing about an effective extraction. The pulsing means may be a piston reciprocating within a cylinder or a diaphragm. Sometimes the pulsing means does not work directly on the contents of the column but an inert gas-liquid or gas may serve as intermediate means.

8 is an outlet pipe for the lighter component which is separated from the heavier component supplied to the same container. The light solution is let out at 9. In a pulsed column of conventional type the three column elements according to FIGURE 5 would have been joined to a single straight column.

The desired reduction of the vertical dimension could also be obtained in a known manner by providing each of the three column elements with separate and complete collecting vessels so that three complete pulse columns are obtained, which are connected in series. This arrangement, however, creates complicated control problems in connection with the simultaneous operation of the columns. In the present invention this difficulty is entirely avoided and the construction is simplified. The pulsing movement of the liquid required for the extraction process is at the same time used for the transport of the liquid between the column elements. On the assumption that the pulsed volume and the volume contained in the connection line are approximately equal, it will be found that a liquid slug in position A in FIGURE 5 will be moved to position B during one pulse stroke. During the pulsing, the liquid column within the connection pipe will, therefore, oscillate to and fro between associated column elements. The difference in the densities of the two liquid phases gives rise to a certain valve action at the ends of the column elements so that a net transport of the light and the heavy phases respectively, through the connection line, is brought about. The amplitude of the pulse stroke in the connection line is of course considerably greater than in the column (the amplitudes are inversely proportional to the square of the corresponding average diameters). A separation of the two phases in the connection line will therefore not take place in general. On the contrary, an emulsion can even be produced in the connection in certain systems if the speed of the liquids is too high. Since emulsion is not desirable, in such cases shorter column elements and wider connection lines should be used. If separation should still occur in particularly wide connection lines, this can be avoided by suitable means for bringing about a turbulent flow within the connection lines. It will be noted that if for some reason, such as at standstill, the heavier liquid component should accumulate at the lower ends of the column elements, a transport will occur quickly to the next column element due to the high sedimentation speed of the large heavy liquid drops as from the connection line they reach the widened upper part of the following column element. A corresponding effect will occur if the lighter component accumulates at the top of the column element.

Gas which enters, or is generated in, the column system might be expected to deteriorate the transport in the connection line since cushions are believed to be formed in the top of the column elements. However, if suitable diameters of the connection lines are chosen the gas will be transported quickly, together with the lighter phase, to the top of the column of the last column element where the gas is separated from the liquid. However, in very wide connection lines permanent gas cushions may be formed, and in this case the wide connection line may be replaced by several parallel, more closely connected connection lines.

The top of each column element may also be provided with ventilation devices, by which gas may be removed continuously or intermittently, but this measure is believed to be necessary in exceptional cases only.

The pulses do not require any particular shape, but may have the shape of a sine or another curve. One can work with such pulsing conditions that a certain separation takes place during each cycle. In this case comparatively great drops or coherent liquid quantities of the heavy and the light phases respectively will be transported by the oscillations in the connection lines. With too high frequency and too great amplitude however separation will not occur. The transport will then be effected in the shape of finer or coarser dispersion.

As concerns the other construction of the column, unlimited possibilities are open for using the conventional technique since the principle and the method of operation of the pulse columns are not changed in the present invention.

One of the advantages of the invention resides in that one can make use of existing data for the pulse columns and therefore dimension the same on the basis of available technology. Due to the division of the column into column elements a valuable adaptability is obtained, so that the number of column elements may be increased or decreased in a simple manner according to the requirements of the processing. This is not possible with conventional columns and the present invention therefore is a considerable progress also for applications other than within the nuclear energy domain. Due to the compactness of the construction better possibilities are opened for a rational construction and disposition of the service and supervision organs. All these advantages, and first and foremost the greatly reduced requirement for the "shielded volume," have the result that the costs of construction, and the total processing costs are considerably reduced especially in extraction plants for radio active materials.

What is claimed is:

Apparatus for liquid-liquid extraction of a heavy phase and a light phase in countercurrent flow, said heavy phase and said light phase being substantially immiscible, comprising a plurality of series connected vessels, inlet means for the heavy phase and outlet means for the light phase at one end of the apparatus and outlet means for the heavy phase and inlet means for the light phase at the other end of the apparatus, a pulsing means operatively connected to one of the vessels, and means connecting the upper part of a first vessel to the lower part of a second vessel, said connecting means comprising at least one open connection line, common to both phases, said line being capable of transmitting liquid in both directions, the lower part of the second vessel being located below the said upper part of the first vessel, the volume of each connection line being not greater than approximately the volume which is displaced therethrough at one stroke of said pulsing means.

References Cited in the file of this patent

Jealous and Lieberman: "The Concatenated Pulse Column," Chemical Engineering Progress, September 1956, pages 366–370.